United States Patent [19]

Bateman

[11] 3,757,588
[45] Sept. 11, 1973

[54] WHEEL BALANCER
[76] Inventor: William C. Bateman, 1110 E. 78th St., Derby, Kans. 67233
[22] Filed: Sept. 23, 1971
[21] Appl. No.: 182,942

[52] U.S. Cl. .............................................. 73/483
[51] Int. Cl. .............................................. G01n 1/12
[58] Field of Search .................... 73/482, 483, 484, 73/485, 486, 487; 144/288

[56] References Cited
UNITED STATES PATENTS
| | | | |
|---|---|---|---|
| 3,164,996 | 1/1965 | Carrigan | 73/483 |
| 3,492,878 | 2/1970 | Mitchell | 73/485 |
| 1,701,464 | 2/1929 | Kraft | 73/483 |
| 2,270,657 | 1/1942 | Kraft | 73/484 |
| 3,038,343 | 6/1962 | Deist | 73/483 |
| 2,306,528 | 12/1942 | Davis et al. | 73/483 |
| 3,580,320 | 5/1971 | Roberts | 73/487 X |

Primary Examiner—Herbert Goldstein
Attorney—John H. Widdowson

[57] ABSTRACT

A wheel balancer has pedestal mountable in a base. A wheel support mounts on the pedestal by a spherical bearing. The wheel support supports a wheel and a level indicator on one side, and is supported from the other by the spherical bearing. It is reversible to support different sized wheels.

1 Claim, 3 Drawing Figures

Patented Sept. 11, 1973
3,757,588
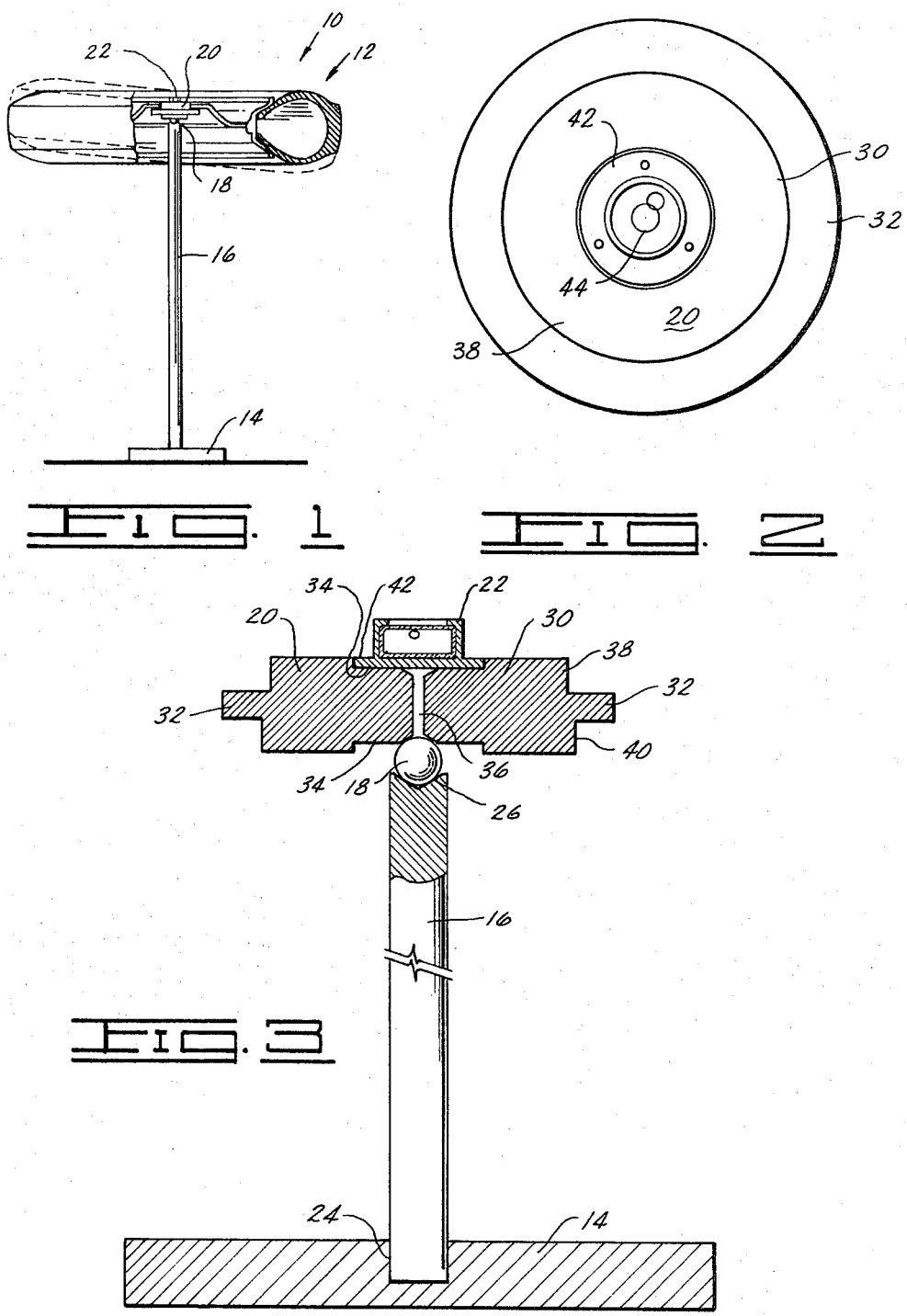
INVENTOR
WILLIAM C. BATEMAN
BY John H. Widdowson
ATTORNEY

WHEEL BALANCER

Numerous wheel balancers are known in the prior art that are adapted for the static balancing of wheels, particularly automotive wheels. However, these prior art devices are generally quite large structures adapted to be used in garages, service stations, etc., where they are subjected to a great deal of use and are sufficiently strong to withstand abuse and still function satisfactorily. These prior art devices are wheel balancing devices which are both expensive and physically cumbersome for the small garage operator or the individual who does his own automotive or vehicle repair.

In one preferred embodiment of this invention, a static wheel balancer is provided which includes a pedestal removably mountable on a base having a wheel support and level indicator mountable on the pedestal by a spherical bearing. The base, pedestal, wheel support, spherical bearing and level indicator are all detachable from one another for storage and assemblable for use. The base and pedestal are constructed sufficiently strong to support a wheel and the wheel support member in a rigid manner. The wheel support member is constructed somewhat symmetrically having on each side a surface to centrally support a wheel, a level indicating device and an indentation to receive the spherical bearing. The wheel support member is adapted to rest on top of a spherical bearing on the top of the pedestal and support a wheel and the level indicating device on the top side.

One object of this invention is to provide a wheel balancer overcoming the disadvantages of the prior art devices.

Still, one other object of this invention is to provide a static wheel balancer having a structure that can be easily assembled for use and disassembled for storage.

Still, another object of this invention is to provide a static wheel balancer having a wheel support member mountable on a spherical bearing and adapted to pivot in order to enable the wheel to be statically balanced.

Yet another object of this invention is to provide a static wheel balancer that can be assembled for use, disassembled for storage in a small space, is simple to assemble and use and can be economically manufactured.

Various other objects, advantages, and features of the invention will become apparent to those skilled in the art from the following discussion, taken in conjunction with the accompanying drawings, in which:

FIG. 1 is an elevation view of the wheel balancer with a pneumatic tire and wheel in the balanced position on the wheel support member having a portion of the wheel removed for clarity and showing the wheel in dashed lines in an unbalanced condition;

FIG. 2 is a plan view of the wheel support member with the level indicator mounted therein showing the bubble in an unlevel position; and FIG. 3 is an elevation view of the wheel balancer partially in cross-section and in the balanced position.

The following is a discussion and description of preferred specific embodiments of the wheel balancer of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, the wheel balancer of this invention, generally indicated at 10, is shown with a pneumatic wheel and tire 12 positioned thereon. The wheel balancer includes a base 14 to support a pedestal 16, with a spherical bearing 18 atop the pedestal 16 and a wheel support member 20 and level indicator 22 atop the bearing 18.

The supporting portion of the wheel balancer 10 includes the base 14, pedestal 16 and spherical bearing. The base 14 has an aperture 24 therein to receive and support the pedestal 16 in an upright position as shown in FIG. 3. The base 14 is preferably constructed of sufficient thickness so the aperture 24 will be of sufficient depth to substantially rigidly support the pedestal 16. It is to be noted the aperture 24 does not go through the base 14 and does conform to the shape of the pedestal 16. The shape of the base 14 is preferably square or circular but the specific shape is not of particular importance so long as it is of sufficient size and span to prevent tipping when the wheel balancer is in use.

The pedestal 16 can be easily removed from the base 14 by extracting it from the aperture. Essentially the pedestal 16 is an elongated member having an indentation 26 on end which will be the receptacle for the spherical bearing 18. The indentation 26, as shown in the drawing, is conical so as to contact the spherical bearing in a uniform manner on the lower portion thereof. In practice it has been found that a pedestal of about 8 inches in length is sufficient to position the wheel support member 20 high enough so most automotive vehicle wheels can be balanced.

The wheel support member 20 is a member that can be used reversibly on the wheel balancer 10. The wheel support member 20 has an integrally formed center portion, indicated at 30, and an outer wheel supporting flange 32. The center portion 30 has a large centrally positioned indentation 34 on the opposite sides thereof to receive the level indicator 22. An aperture 36 is centrally positioned through the center portion 30 and is champhered on the outer ends so as to contact the spherical bearing 18. The preferred arrangement of the indentations and aperture can be seen clearly in FIG. 3. On the outer edge of the center portion 30 the peripheral surfaces are of different diameters on each side of the wheel support flange 32. As shown in FIG. 3 the upper side 38 of the center portion 30 has a smaller diameter than the lower side 40 thereof. These different diametered sides 38 and 40 are centered relative the aperture 36 and are used to center the hub engaging portion of a wheel on the wheel support member 20. The specific diameters of the center portion 30 are to be determined by the specific wheels to be balanced. Two different diameters are shown in the drawings to demonstrate versatility of the tool being used with different diameters of wheel hubs.

It has been found practical in practice to use a circular bubble type level as the level indicator 22 as shown in the drawings. The circular bubble level 22 has a circular based housing 42 with a centered level indicating ring 44 on the lens. The circular bubble level 22 is by its circular nature well adapted for use with the wheel balancer 10 because it is easily and accurately centrally positioned and can be easily removed. It should be understood that other level indicators besides the circular bubble level indicator 22 can be used on the herein described wheel balancer 10.

The spherical bearing 18 is preferably a ball bearing similar to ones used in roller bearings. The bearing 18 is hardened material so that both the pedestal 16 and the wheel support portion 20 will not dent it and so they will slide freely on it. In order that a wheel be statically balanced properly and accurately, the wheel support member 20 must freely rotate on the spherical bearing 18. The spherical bearing 18 contacts the wheel support member 20 and the pedestal on a circular ring-like portion of its surface.

In using the wheel balancer 10 it is assembled and positioned as shown in FIG. 3 so a wheel can be placed on it. FIG. 1 shows a wheel 12 in place on the wheel support 20 having the wheel hub portion centered on it. When a wheel 12 is first placed on the balancer, it will probably take a position somewhat like that in the dashed lines in FIG. 1, an unbalanced condition. When weights are placed on the wheel rim so as to bring it into a statically balanced condition, the wheel 12 takes the position shown in the solid lines of FIG. 1 and the level indicator 22 shows a level position. As weights are added to the wheel 12, the wheel support member 12 slides on the spherical bearing 18. After weights have been secured in the wheel 12, it can be removed from the wheel balancer 10 and the wheel balancer used again or dismantled and stored.

In the manufacture of the wheel balancer 10 of this invention it is obvious the base 14, pedestal 16, spherical bearing 18, and wheel support member 20 can be easily constructed of materials having sufficient strength to support a wheel for balancing. The wheel balancer 10 can be constructed in several sizes adaptable to balance different sizes of wheels such as motor scooter size wheels, automobile size wheels or truck size wheels.

In the use and operation of the wheel balancer 10 of this invention, it is seen that same provides a structure of sufficient size to support a wheel for static balancing which will not easily tip. The wheel balancer 10 is easily assembled and used and can be easily disassembled for storage.

As will be apparent from the foregoing description of the applicant's wheel balancer structure, relatively inexpensive means have been provided to statically balance wheels in the horizontal position. The wheel balancer structure is economical to manufacture, simple to use, easily assembled for use, and easily disassembled for storage.

While the invention has been described in conjunction with preferred specific embodiments thereof, it will be understood that this description is intended to illustrate and not limit the scope of the invention, which is defined by the following claims.

I claim:

1. A wheel balancer comprising:
   a. an upright pedestal type member mountable in a base member,
   b. a spherical bearing mountable on the upper end of said pedestal,
   c. a wheel support member mountable on said spherical bearing adapted to receive and support a wheel,
   d. a level indicating means mountable in said wheel support member, said wheel balancer adapted to receive a wheel at the spindle mounting portion thereof so as to enable it to be balanced,
   e. said pedestal type member is removably mounted in a base member and has an indented upper end portion of conical shape to removably receive and hold said spherical bearing in a horizontal line contact,
   f. said wheel support member has a circular center portion with a circular wheel supporting flange extending therefrom, an indentation on each side of said center portion to removably receive said level indicating means and another indentation centered on each side of said center portion to receive said spherical bearing such that said wheel support member will pivot on said spherical bearing, said centered indentions being interconnected by a central aperture,
   g. said wheel supporting flange extends outward from the center portion of said wheel supporting member circular center portion sufficient to support a wheel thereon, said wheel supporting center circular portion has a larger diameter on one side surface of said wheel supporting flange than on the opposite side surface of said wheel supporting flange for use with wheels of different diameters,
   h. said indentation to receive said level indicating means is a cylindrical shaped portion concentric with said center portion, said other indentation to receive said spherical bearing is said aperture centered relative said center portion having the outer ends thereof chamfered to contact said spherical bearing, and
   i. said level indicating means is a bubble level indicating means having a circular housing containing liquid with a bubble visible therein with said circular housing centered about said central aperture to aid in centering the bubble in the center of said aperture which indicates the level condition.

* * * * *